United States Patent
Hayford et al.

(10) Patent No.: US 7,124,862 B2
(45) Date of Patent: Oct. 24, 2006

(54) BRAKE SLACK ADJUSTER

(75) Inventors: Roy Lee Hayford, Redford, MI (US); Joseph A. Kay, Highland, MI (US); Thomas M. Cory, Sterling Heights, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 10/670,594

(22) Filed: Sep. 25, 2003

(65) Prior Publication Data

US 2005/0067234 A1    Mar. 31, 2005

(51) Int. Cl.
*F16D 51/00* (2006.01)
*F16D 65/14* (2006.01)

(52) U.S. Cl. .............. 188/79.55; 188/196 V
(58) Field of Classification Search ............. 188/79.55, 188/196 BA, 196 M, 196 V, 79.51
See application file for complete search history.

(56) References Cited

U.S. PATENT DOCUMENTS 4,256,208 A * 3/1981 Najer et al. ............. 188/196 D
4,544,046 A * 10/1985 Lissau ..................... 188/79.55
4,693,342 A * 9/1987 Lavely .................... 188/79.55

OTHER PUBLICATIONS

Automatic Slack Adjuster, Maintenance Manual 4B, Mar. 1998, ArvinMeritor, Inc., p. 1-22.

* cited by examiner

*Primary Examiner*—Melody M. Burch
(74) *Attorney, Agent, or Firm*—Carlson, Gaskey & Olds (57) ABSTRACT

A brake slack adjuster is provided that includes a housing having an opening with a gear arranged within the opening. The housing includes a bore adjacent to the opening. A worm gear has an axis disposed within the bore and is an engagement with the gear. The worm gear has an end portion with helical teeth. An actuator loosely is arranged within the bore and includes an inner surface with complementary helical teeth engaging the helical teeth of the worm gear. An actuator rod includes an end arranged within the actuator aperture. The rod end is captured in the actuator by a retainer. A pawl assembly is supported by the housing and coacts with the actuator for retaining the actuator in a rotational position relative to the axis. Biasing members are arranged between the actuator and housing bore to urge the actuator engagement with the worm gear end portion. The actuator includes an elongated slot with and end of the pawl assembly captured with in the elongated slot to prevent rotational movement of the actuator relative to the housing. The elongated slot permits movement of the actuator in the direction of the axis.

18 Claims, 7 Drawing Sheets

BRAKE SLACK ADJUSTER

BACKGROUND OF THE INVENTION

This invention relates to an automatic slack adjuster of the type used for commercial vehicle braking systems.

Commercial vehicle braking systems typically incorporate a slack adjuster in each brake assembly to adjust the clearance between the brake linings and the rotating brake element, such as a brake drum or rotor. The brake assembly includes an actuator, such as an air chamber, that urges the brake linings into engagement with the brake element. As the linings wear, the clearance between the brake linings and brake element increases requiring the air chamber push rod to move a greater distance to apply the brakes. It is desirable to maintain a relatively constant clearance throughout the life of the brake linings to provide consistent braking performance. Slack adjusters are employed to keep the distance that the air chamber push rod must move within a specified range as the linings wear to maintain a consistent clearance.

Automatic slack adjusters have been developed to adjust for the clearance between the brake linings and brake element during normal vehicle operation. One automatic slack adjuster available from the Assignee of the present invention incorporates a worm gear in engagement with a gear. The gear is connected to a camshaft that moves the brake lining into engagement with the brake element upon actuation of the air chamber. When excess clearance occurs, the worm gear is rotated by an adjustment assembly connected between the worm gear and the push rod. Rotating the worm gear adjusts the rotational position of the slack adjuster relative to the camshaft, which adjusts the push rod travel.

The worm gear is disposed within a bore in the housing. An end portion of the worm gear has longitudinally extending teeth. A cylinder-shaped actuator is disposed within the bore and includes an inner diameter having longitudinally extending teeth engaging the teeth of the worm. An actuator piston is disposed within an internal actuator cavity and is retained therein by a piston retaining ring. An end of the actuator rod is pinned to the actuator piston. A spring loaded pawl assembly is supported by the slack adjuster housing and includes an end having teeth that engage the outer diameter of the actuator. The outer diameter of the actuator has helical teeth that cooperate with the teeth on the pawl assembly.

The actuator rod moves the piston along a length defined by the actuator cavity in response to the brake being applied and released. The actuator fits loosely within the bore to permit lateral movement of the actuator within the bore. When excess clearance has developed, the actuator rod will pull the actuator in a direction away from the worm gear with the actuator piston. As a result, the actuator will "jump" a tooth relative to the pawl assembly teeth such that on the brake release the worm will rotate the gear relative to the slack adjuster for the next brake apply thereby taking up the clearance.

As can be appreciated for the above description of prior art slack adjusters, the slack adjuster utilizes numerous components adding cost and complexity to the assembly of the slack adjuster. For example, the actuator requires machining on both the inner and outer diameters, and the spring loaded pawl requires numerous parts. Therefore, what is needed is a simplified slack adjuster that reduces the cost of the assembly.

SUMMARY OF THE INVENTION AND ADVANTAGES

The present invention provides a brake slack adjuster including a housing having an opening with a gear arranged within the opening. The housing includes a bore adjacent to the opening. A worm gear has an axis disposed within the bore and is in engagement with the gear. The worm gear has an end portion with helical teeth. An actuator is loosely arranged within the bore and includes an outer surface adjacent to the bore and an inner surface opposite the outer surface. The inner surface has complementary helical teeth engaging the helical teeth of the worm gear end portion. The actuator is moveable along the axis relative to the worm during adjustment of the slack adjuster. The actuator includes an aperture, and an actuator rod includes an end arranged within the actuator aperture. The rod end is captured in the actuator by a retainer. A pawl assembly is supported by the housing and coacts with the actuator for retaining the actuator in a rotational position relative to the axis. The present invention retainer arrangement eliminates the prior art piston.

Biasing members are arranged between the actuator and housing bore to urge the actuator engagement with the worm gear end portion. Preferably, the biasing members are retained by the actuator, which may be plastic to reduce the weight and cost of the actuator. Furthermore, the actuator includes only a half cylindrical wall or less on which the teeth are formed. The actuator includes an elongated slot with and end of the pawl assembly captured with in the elongated slot to prevent rotational movement of the actuator relative to the housing. The elongated slot permits movement of the actuator in the direction of the axis. The present invention pawl and actuator configuration eliminates the expressive components of the prior art spring-loaded pawl assembly.

When excess clearance within the brake assembly occurs, the actuator rod will reach a position in which the rod moves the actuator along the axis such that the actuator teeth "jump" the teeth of the worm gear. Subsequent manipulations of the slack adjuster by the air chamber cause the worm gear to rotate the gear thereby repositioning the slack adjuster to take up the clearance.

Accordingly, the above invention provides a simplified slack adjuster that reduces the cost of the assembly.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1A:
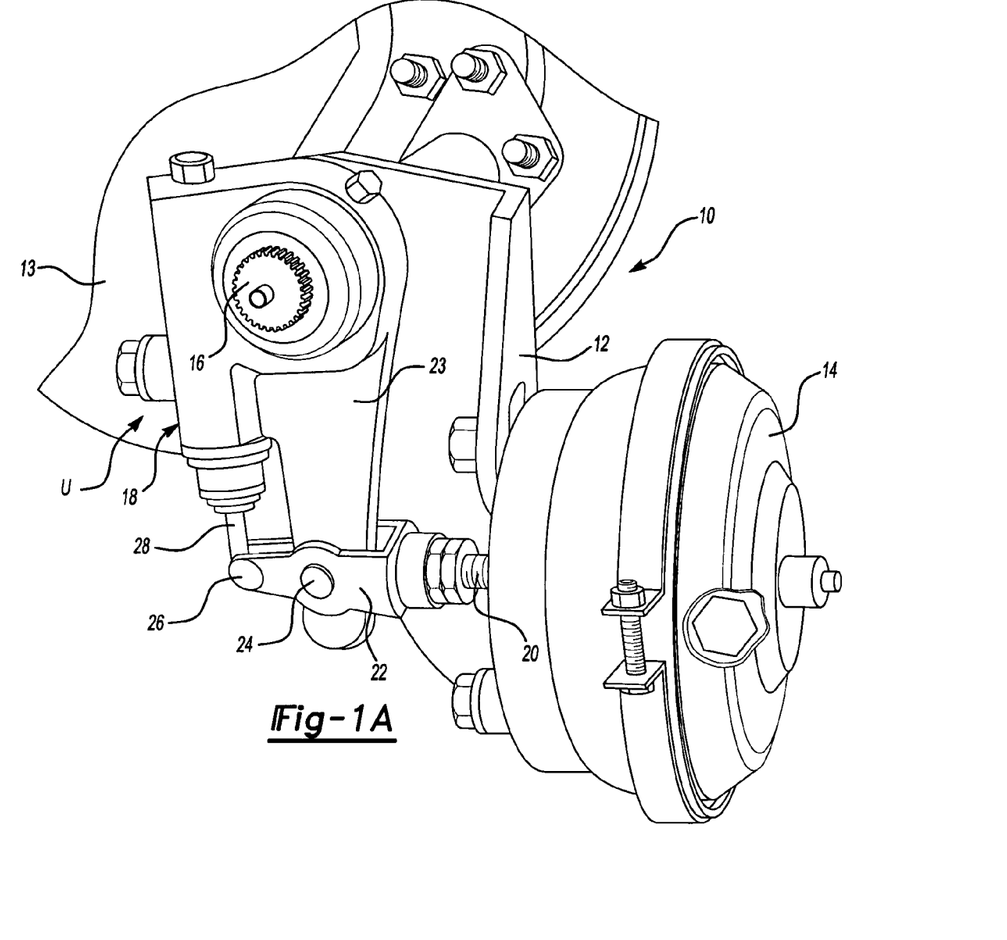
FIG. 1A is a perspective view of a brake assembly incorporating an automatic slack adjuster.

A brake assembly 10 is shown in FIG. 1A. The brake assembly 10, attached to an axle 13, includes an air chamber 14 supported by a bracket 12. An S-camshaft 16 may be supported in a brake spider to force opposing brakes shoes into engagement with a brake drum, as is well known in the art. It is to be understood that the present invention may be used in brake configurations other than that described above. For example, an actuator other than an air chamber may be used, or a brake rotor and its typical associated components may be used instead of a brake drum configuration.

The present invention automatic slack adjuster 18 is splined to the end of the S-camshaft, which is described in more detail below. The air chamber 14 includes a push rod 20 that has a clevis 22, which is pivotally connected to a housing 23 of the adjuster 18 by a large pin 24. The length of the push rod 20 corresponds to the air chamber stroke, which must stay within a desired range to ensure proper operation of the brake assembly 10. As the brake linings wear, the air chamber stroke increases. The adjuster 18 includes an adjustment assembly that includes an actuator rod 28, which is pivotally connected to the clevis 22 by a small pin 26.

As the push rod 20 is extended by the air chamber 14, which may correspond to a brake apply event, the actuator rod 28 is pulled out of the housing 23. Conversely, when the push rod 20 is retracted by the air chamber 14, which may correspond to a brake release event, the actuator rod 28 is moved further into the housing 23. It should be understood that the slack adjuster 18 of the present invention may be configured so that the actuator rod 28 is manipulated in an opposite manner than that described.

Figure 1B:
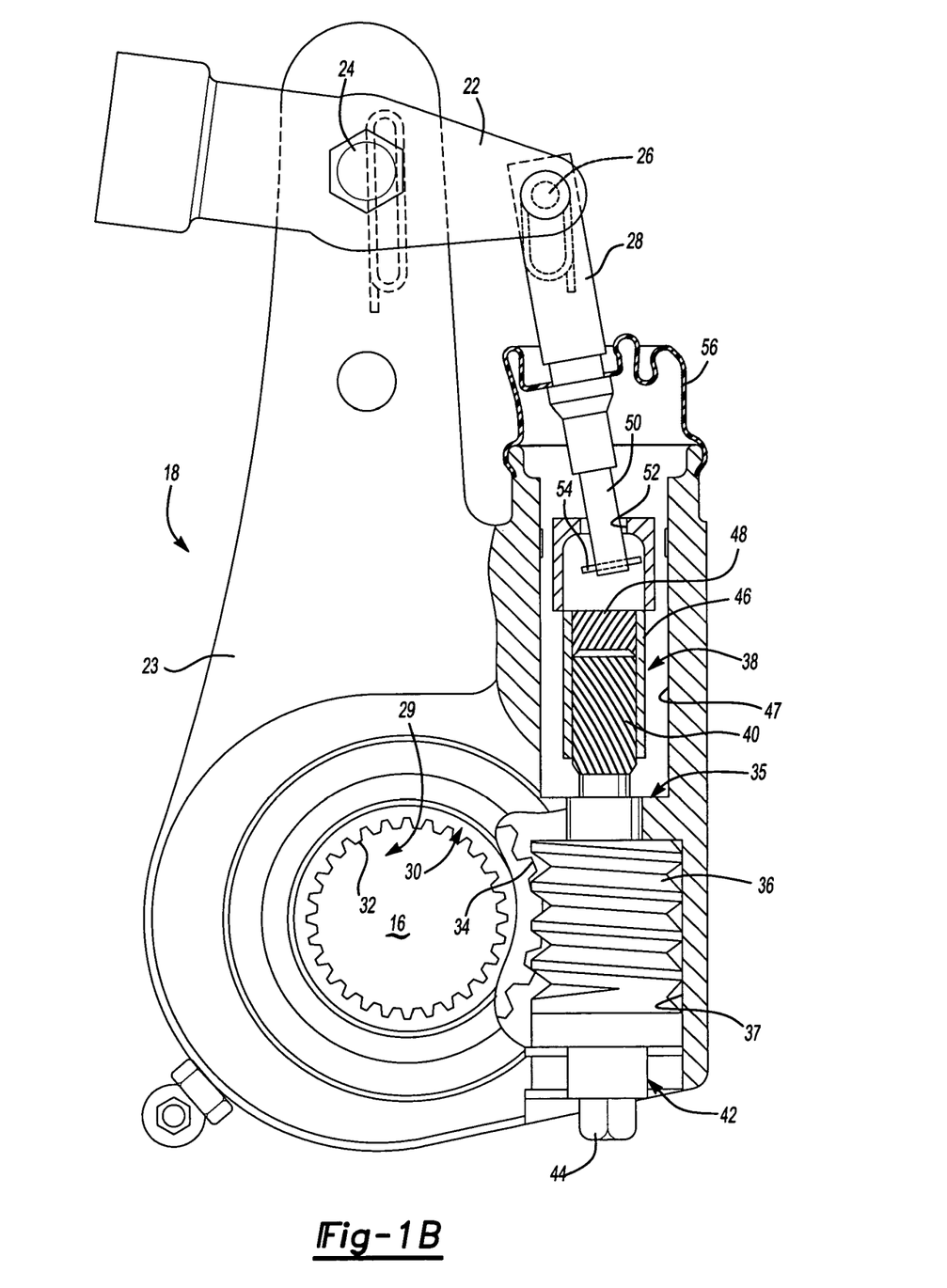
FIG. 1B is a cross-sectional view of the present invention slack adjuster.

Referring to FIG. 1B, the housing 23 includes an opening 29 with a gear 30 disposed therein. The gear 30 includes internal teeth 32 that engage complementary teeth on the end of the shaft 16. The clearance is automatically adjusted using the slack adjuster 18 by rotating the housing 23 relative to shaft 16 by driving the gear 30 with the present invention adjustment assembly, as will be appreciated from the description below.

The housing 23 includes a bore 35 adjacent the opening 29 with a worm gear 36 arranged therein having teeth engaging teeth 34 of the gear 30. The toothed portion of the worm gear 36 is arranged within a first portion 37 of the bore 35. The worm gear 36 has one end 38 with helical teeth 40 and another end 42 extending from the housing 23 defining a manual adjustment 44. The adjustment 44 is used to manually rotate the worm gear 36 when the brakes are serviced by a technician. An actuator 46 is loosely received within a second portion 47 of the bore 35. The actuator 46 includes an arcuate wall having an inner surface with complimentary helical teeth 48 engaging the helical teeth 40. The present invention actuator 46 does not include teeth on its outer surface and does not have an arcuate wall extending circumferentially 360° about its axis.

An end 50 of the actuator rod 28 extends into a cavity in the actuator 46 through an aperture 52. The end 50 is captured within the actuator cavity by a retainer 54. The prior art piston is not required. A boot 56 is supported on the housing 23 and encloses about a portion of the actuator rod 28 to prevent debris from entering the housing 23 and interfering with the adjustment assembly.

When the retainer 54 engages the upper portion of the actuator 46, the actuator 46 is pulled away from the worm gear 36. Conversely, when the retainer 54 engages the bottom of the actuator cavity, the actuator 46 is moved toward the worm gear 36. The axial length of the actuator cavity generally corresponds to a permissible clearance range. That is, when an excessive clearance occurs the actuator rod 28, the retainer 54 will pull the actuator 46 away from the worm gear 36 to adjust the position of the slack adjuster 18. Conversely, the actuator rod retainer 54 will push the actuator 46 toward the worm gear 36 to complete the adjustment, as will be appreciated from the description below.

Figure 2:
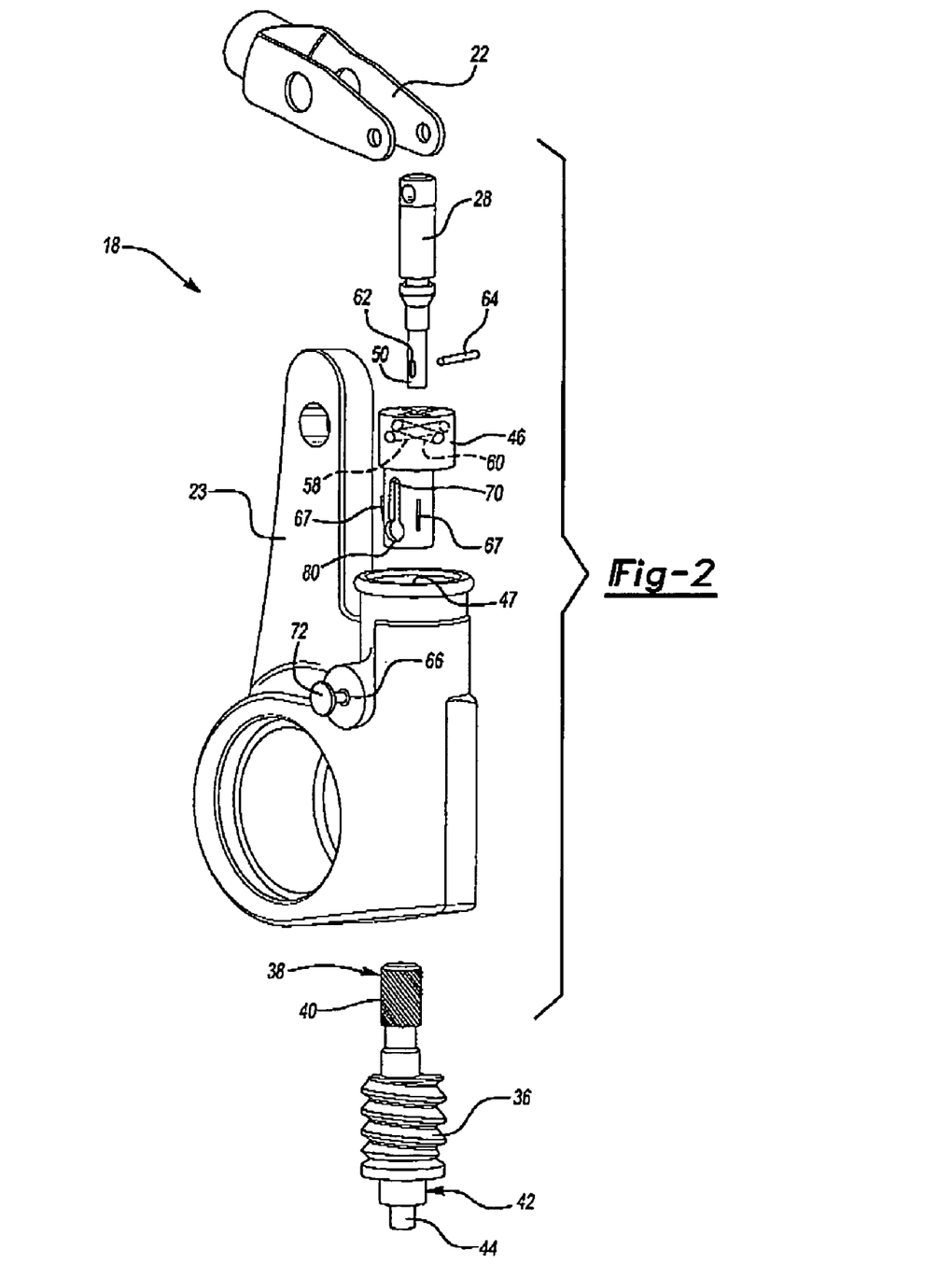
FIG. 2 is an exploded perspective view of the present invention slack adjuster.

Referring to FIG. 2, the actuator 46 includes first 58 and second 60 transverse holes. The end 50 of the actuator 28 includes a slot 62 that defines the permissible clearance, unlike the retainer 54 and actuator 46 interface described above relative to FIG. 1B. The rod 28 is captured in the actuator 46 by a pin 64 that is received in one of the holes 58, 60 extending through the slot 62. The rod 28 pulls the actuator 46 away from the worm gear 36 when the pin 64 engages the top of the slot 62, and the rod 28 pushes the actuator 46 toward the worm gear 36 when the pin 64 engages the bottom of the slot 62.

The housing 23 includes a bore 66 transverse to the bore 35 for receiving a pawl assembly 68 that prevents relative rotation of the actuator 46 relative to the housing 23. A handed pawl assembly position is shown in FIG. 2 in which the pin 64 is received in the hole 58. For an unhanded pawl assembly position in which the pawl assembly is located at the front of the housing 23 (shown at U in FIG. 1A), the actuator 46 must be rotated 90 degrees such that the pin 64 would be received in the hole 60.

Figure 3:
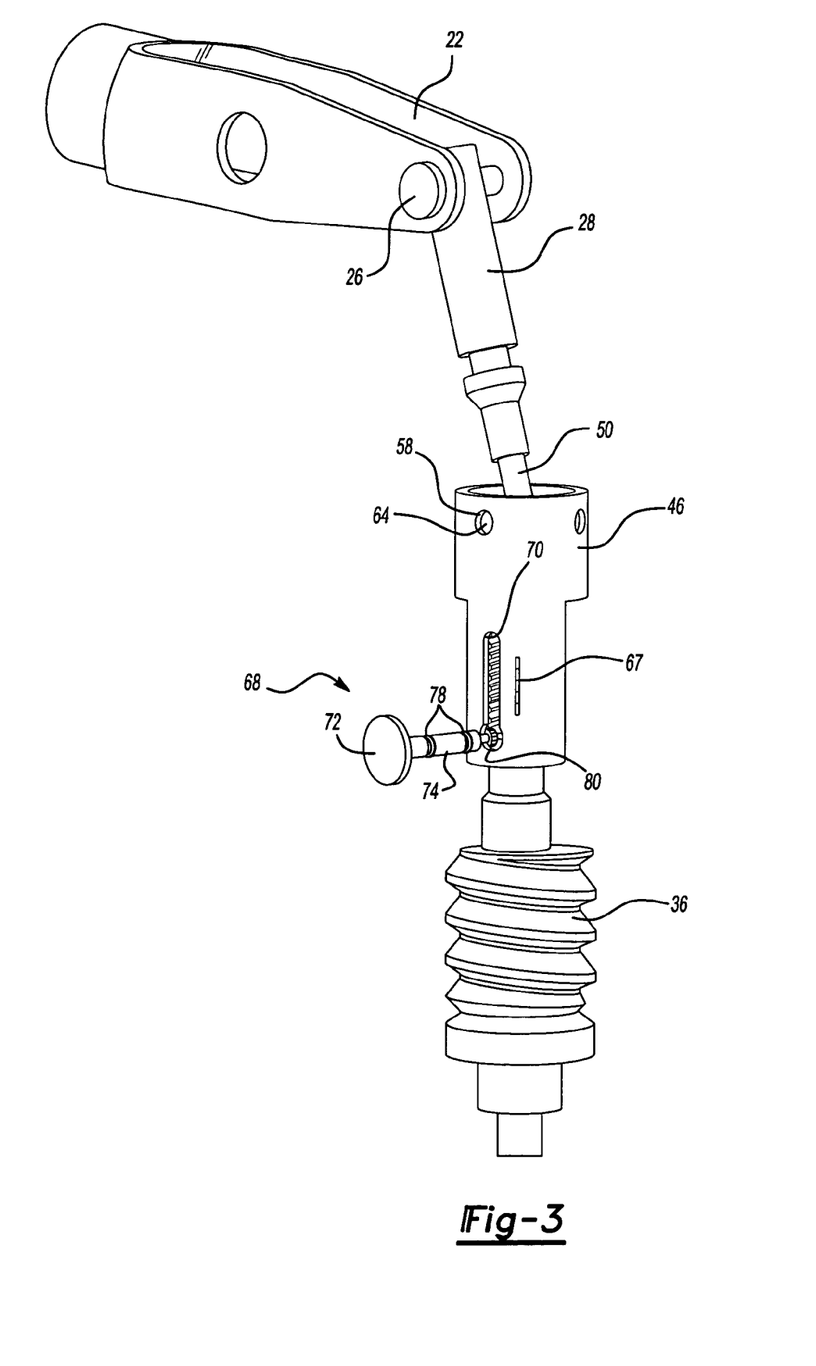
FIG. 3 is a perspective view of the actuator and pawl assembly shown in FIG. 2 engagement with one another.
Figure 4:
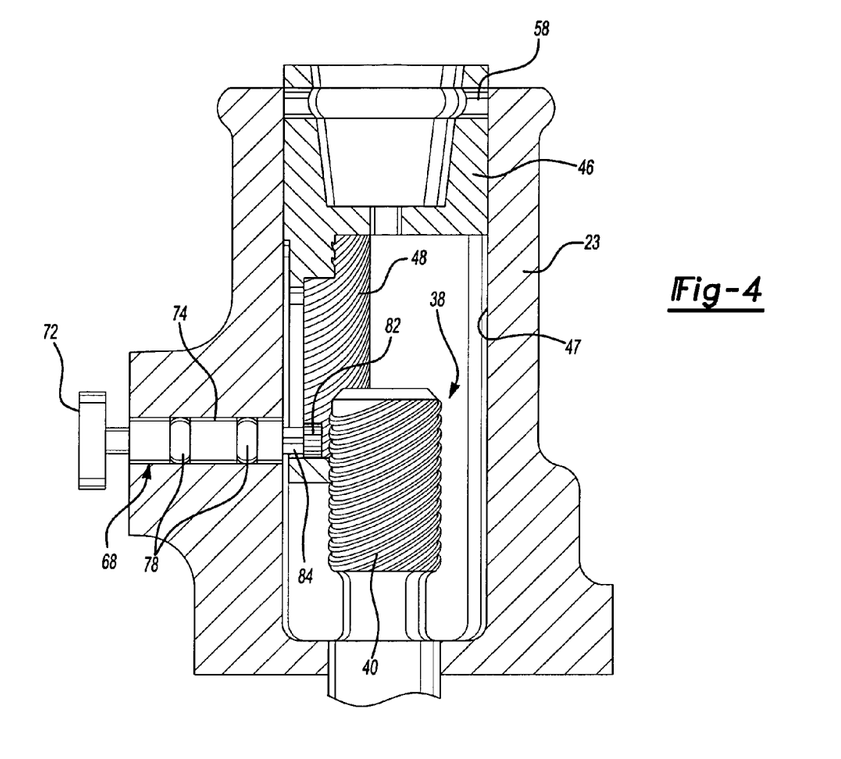
FIG. 4 is a cross-sectional view of the housing depicting the pawl assembly in engagement with the actuator.
Figure 5A:
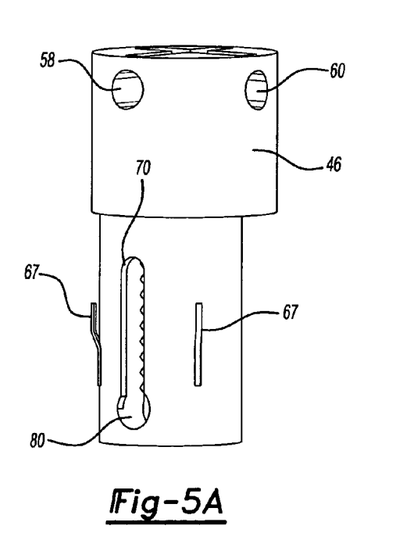
FIG. 5A is a rear perspective view of one actuator.
Figure 5B:
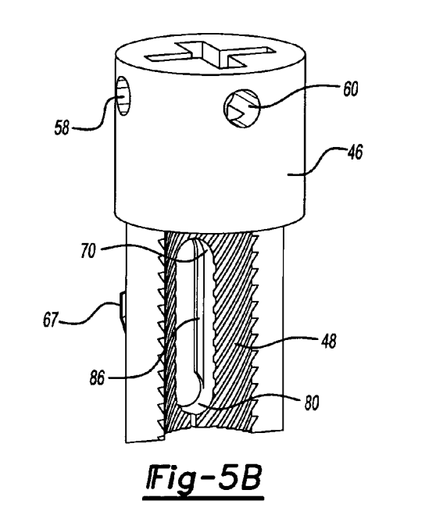
FIG. 5B is a front perspective view of the actuator shown in FIG. 5A.

The pawl assembly 68 coacts with the actuator 46 for retaining the actuator 46 in a rotational position relative to the axis. Referring to FIGS. 2 and 3, the pawl assembly 68 cooperates with an elongated slot 70 to rotationally locate the actuator 46 relative to the housing 23 while permitting axially movement of the actuator 46 so that the rod 28 may push and pull the actuator 46 relative to the worm gear 36 during adjustment. The pawl assembly 68 includes a knob 42 to pennit manipulation of the pawl assembly by a technician for manual adjustment of the slack adjuster 18. A shaft 74 extends from the knob 72 and is received within the bore 66. The shaft 74 includes a pair of annular grooves 76 receiving O-ring 78 for providing a seal between the pawl assembly 68 and the housing 23. The elongated slot 70 includes an enlarged opening 80 sized to receive an end 82 of the pawl, which is best shown in FIG. 4. The pawl assembly 68 includes neck 84 adjacent to the end 82 that is narrower than the diameter of the end 82. Referring to FIGS. 4–5B, when the pawl assembly 68 is installed for normal operation of the slack adjuster 18, the end 82 extends into the actuator 46 such that the neck 84 is captured by a lip 86 defined by the elongated slot 70.

The pawl assembly 68 is retracted to disengage the pawl from the actuator 46 to permit rotation of the worm gear 36 during manual adjustment by a technician. Removal of the pawl is necessary because the pawl rotationally fixed the actuator 46 to the housing 23 through the interlocking teeth 40, 48.

The actuator 46 includes at least one biasing member 67, shown in FIGS. 5A and 5B, urging the actuator 46 into engagement with the helical teeth 40 of the worm gear 36 to maintain engagement between the teeth. Preferably the actuator 46 is constructed from plastic. The biasing member 67 may be molded into the plastic actuator. The teeth 40 and 48 are inclined into a direction to facilitate slipping or jumping between the teeth as the actuator 46 is moved axially away from the worm gear 36 in response to the actuator rod 28 pulling the actuator 46 upward. As the actuator 46 is moved upward, the teeth 40, 48 begin to separate. The actuator 46 compresses the biasing member 67 to permit the actuator to move axially relative to the worm gear 36. As the peaks of the teeth 40, 48 move past one another as the actuator 46 is moved axially, the teeth "jump" and the teeth 40, 48 reengage in a different relative rotational position. As the actuator 46 moves downward, the actuator 46 rotationally drives the worm gear 36 about its axis to rotate the gear 30.

Figure 6A:
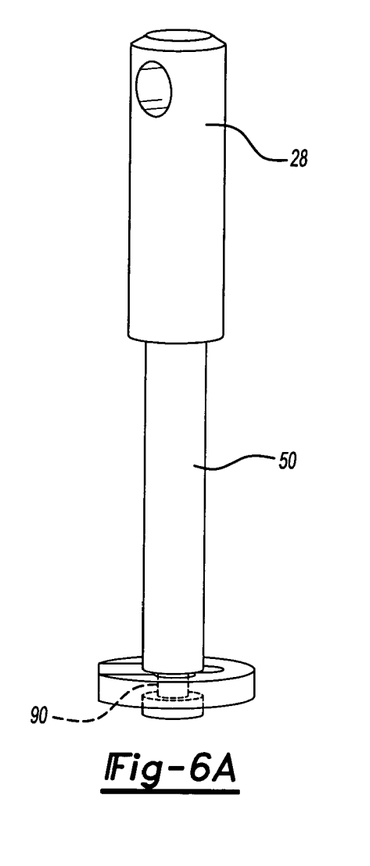
FIG. 6A is a perspective view of one actuator rod of the present invention.
Figure 6B:
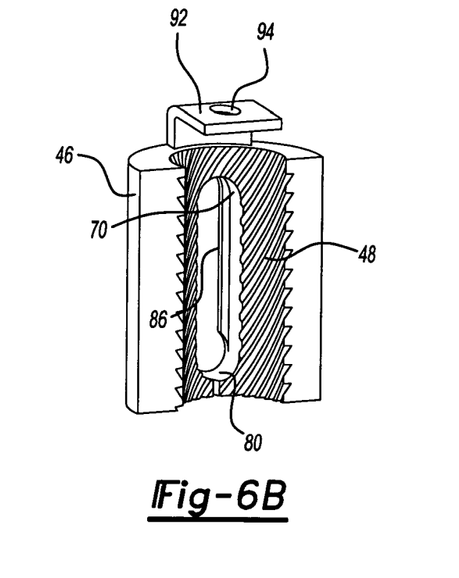
FIG. 6B is a front perspective view of another embodiment of another inventive actuator.
Figure 6C:
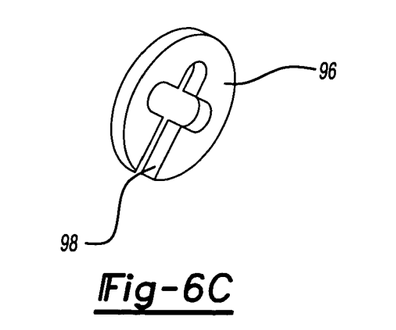
FIG. 6C is a perspective view of a retainer for use with the actuator rod shown in FIG. 6A.
Figure 7A:
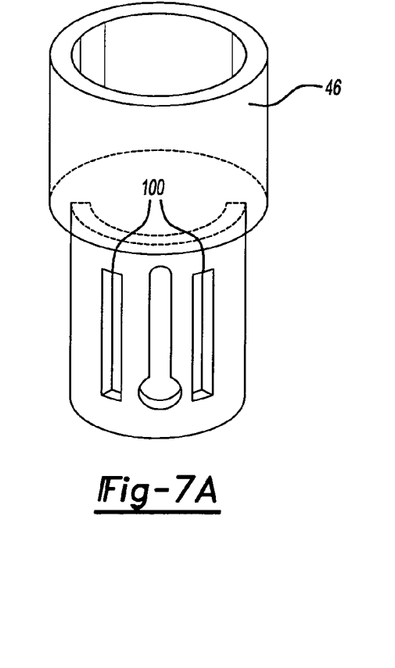
FIG. 7A is a rear perspective view of yet another present invention actuator depicting elongated grooves for receiving a biasing member.
Figure 7B:
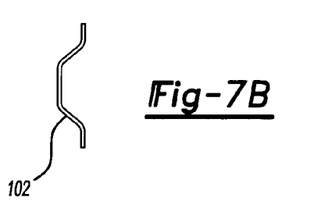
FIG. 7B is a side elevational view of a biasing member for use with the actuator shown in FIG. 7A.

FIGS. 6A–6C depict another actuator rod 28 and actuator 46 interface. The actuator rod 28 may include an annular groove 90 in the end 50. A clip 96 may be slid into the groove 90 using opening 98 to provide the actuator rod arrangement shown in FIG. 1B. An alternative actuator 46 may be used, as shown in FIG. 6B. The actuator 46 may include an L-shaped flange having an aperture 94 for receiving the end 50 of the actuator 28.

Figure 8:
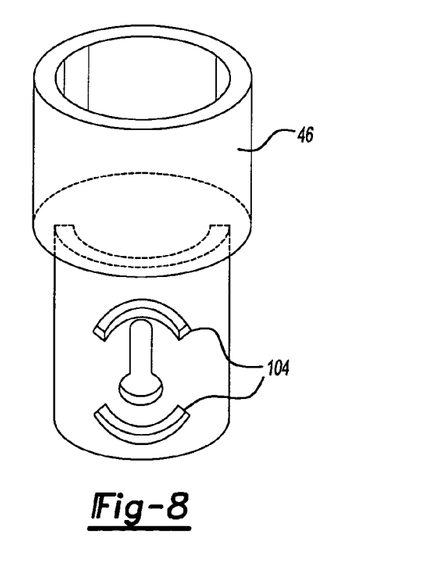
FIG. 8 is a rear perspective view of an actuator having a different retainer groove configuration.
Figure 9:
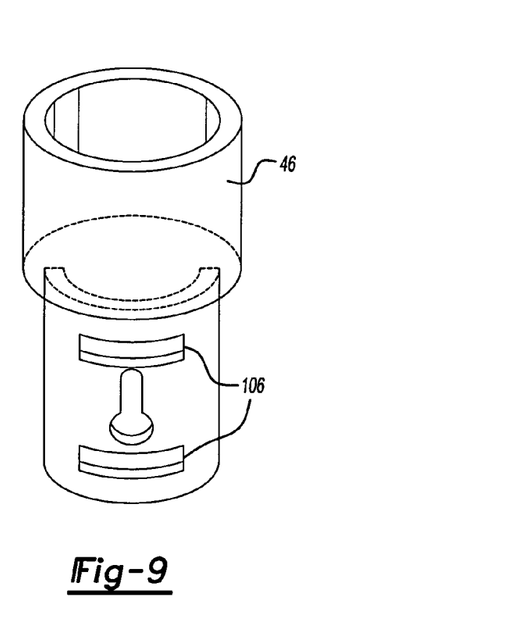
FIG. 9 is a rear perspective view of an actuator having yet another biasing member groove configuration.

Other actuator 46 and biasing member 67 arrangements may also be used, as shown in FIGS. 7A–9. For example, elongated grooves 100 may be arranged in an outer surface of the actuator 46. The biasing member 102 shown in FIG. 7B may be snapped into the elongated grooves 100. Arcuate grooves, as shown in FIG. 8, may also be arranged in the outer surface of the actuator 46. A circular biasing member may be snapped into the arcuate grooves 104. Additionally, a lateral groove arrangement 106 may be arranged in the actuator 46, as shown in FIG. 9.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

The invention claimed is:

1. A brake slack adjuster comprising:
a housing having an opening with a gear disposed within said opening, said housing including a bore adjacent to said opening;
a worm defining an axis, and disposed within said bore engaging said gear, said worm having an end portion with helical teeth;
an actuator including an outer surface adjacent to said bore and an inner surface having complementary helical teeth engaging said helical teeth of said worm, said actuator having an aperture, and said actuator movable along said axis relative to said worm;
an actuator rod having an end disposed within said aperture, and captured in said actuator by a retainer; and
a pawl assembly coacting with said actuator for retaining said actuator in a rotational position relative to said axis.

2. The brake slack adjuster according to claim 1, wherein said actuator is plastic.

3. The brake slack adjuster according to claim 1, wherein said inner and outer surfaces are defined by an arcuate wall.

4. A brake slack adjuster comprising:
a housing having an opening with a gear disposed within said opening, said housing including a bore adjacent to said opening;
a worm defining an axis, and disposed within said bore engaging said gear, said worm having an end portion with helical teeth;
an actuator including an outer surface adjacent to said bore and an inner surface having complementary helical teeth engaging said helical teeth of said worm, said actuator having an aperture, and said actuator movable along said axis relative to said worm, wherein said inner and outer surfaces are defined by an arcuate wall;
an actuator rod having an end disposed within said aperture, and captured in said actuator by a retainer;
a pawl assembly coacting with said actuator for retaining said actuator in a rotational position relative to said axis; and
a biasing member arranged between said actuator and said bore, urging said actuator into engagement with said end portion of said worm.

5. The brake slack adjuster according to claim 4, wherein said actuator is movable along said axis between non-adjustment and adjustment positions in response to said actuator rod moving between brake apply and brake release positions.

6. The brake slack adjuster according to claim 5, wherein said biasing member urges said actuator from said adjustment position to said non-adjustment position.

7. The brake slack adjuster according to claim 5, wherein said helical teeth of said worm and said complementary helical teeth of said actuator temporarily disengage in said adjustment position in response to movement of said actuator rod in a first direction.

8. The brake slack adjuster according to claim 7, wherein said worm rotates said gear to a desired slack adjuster position in response to movement of said actuator rod in a second direction opposite said first direction.

9. The brake slack adjuster according to claim 7, wherein said adjustment position corresponds to said brake apply position and said non-adjustment position corresponds to said brake release position.

10. The brake slack adjuster according to claim 5, wherein said actuator rod end includes a slot having opposing terminal ends defining said non-adjustment and adjustment positions, and said retainer defined by a pin disposed within said slot and secured to said actuator.

11. The brake slack adjuster according to claim 5, wherein said actuator includes a cavity having a length with one end of said length defining said non-adjustment position and the other end of said length defining said adjustment position.

12. The brake slack adjuster according to claim 11, wherein said end of said actuator rod includes an annular groove, and said retainer defined by a clip received in said annular groove.

13. The brake slack adjuster according to claim 11, wherein said actuator includes a flange having said aperture and defining said one end.

14. A brake slack adjuster comprising:
   a housing having an opening with a gear disposed within said opening, said housing including a bore adjacent to said opening;
   a worm defining an axis, and disposed within said bore engaging said gear, said worm having an end portion with helical teeth;
   an actuator including an outer surface adjacent to said bore and an inner surface having complementary helical teeth engaging said helical teeth of said worm, said actuator movable along said axis relative to said worm;
   a biasing member between said actuator and said bore urging said actuator into engagement with said end portion of said worm; and
   a pawl assembly coacting with said actuator for preventing rotational movement of said actuator about said axis relative to said housing.

15. The brake slack adjuster according to claim 14, wherein said pawl assembly is received within a second bore in said housing formed transverse to said bore, said pawl assembly having an end captured within an elongated slot in said actuator which is generally parallel with said axis.

16. The brake slack adjuster according to claim 15, wherein said pawl assembly includes a neck adjacent to said end, and said elongated slot defines a lip with said lip received by said neck.

17. The brake slack adjuster according to claim 16, wherein said elongated slot includes an enlarged opening for receiving said end, and said elongated slot excluding said enlarged opening includes a width less than an end diameter.

18. The brake slack adjuster according to claim 2, wherein a plastic biasing member is provided by said actuator.

* * * * *